United States Patent [19]

Glass

[11] Patent Number: 4,768,648

[45] Date of Patent: Sep. 6, 1988

[54] CALCULATOR MONEY CLIP

[76] Inventor: Larry C. Glass, 202 Rike St., Farmersville, Tex. 75031

[21] Appl. No.: 775,578

[22] Filed: Sep. 13, 1985

[51] Int. Cl.⁴ .......................................... B65D 85/00
[52] U.S. Cl. ...................................... 206/38; 24/3 F; 150/137; 206/305
[58] Field of Search ................... 206/38, 37, 305, 86, 206/242, 259, 265; 150/137; 364/705, 708; D18/11

[56] References Cited

U.S. PATENT DOCUMENTS

| D. 142,357 | 9/1945 | Younghusband | 206/38 |
|---|---|---|---|
| D. 167,506 | 8/1957 | Eckenboy | 206/259 |
| D. 169,825 | 6/1953 | Schildkraut | D11/78.1 |
| D. 186,933 | 12/1959 | Sapiro | D11/78.1 |
| D. 243,250 | 2/1977 | Hazama | 364/708 |
| 1,845,509 | 2/1932 | Moran | 206/242 |
| 1,949,165 | 2/1934 | Krieger | 206/259 |
| 1,973,819 | 9/1934 | Link | 206/265 |
| 2,226,969 | 12/1940 | D'Onofrio | 24/3 R |
| 2,411,053 | 11/1946 | Ornsteen | 206/38 R |
| 3,112,028 | 11/1963 | Kinsell et al. | 206/265 |
| 3,196,507 | 7/1965 | Loda | 24/3 F |
| 3,555,623 | 1/1971 | Cocchiaraley | 206/38 R |
| 4,071,065 | 1/1978 | Halbich | 206/305 |
| 4,075,702 | 2/1978 | Daries | 206/232 |
| 4,120,039 | 10/1978 | Fischer | 364/705 |
| 4,197,586 | 4/1980 | Nidiffer | 361/398 |
| 4,224,675 | 9/1980 | Pinkerman | 364/708 |
| 4,259,568 | 3/1981 | Dynesen | 206/305 |
| 4,308,951 | 1/1982 | Walker, Jr. | 206/371 |
| 4,404,643 | 9/1983 | Ojima et al. | 364/705 |
| 4,478,330 | 10/1984 | Lin | 206/305 |

FOREIGN PATENT DOCUMENTS

| 4683 | 10/1979 | European Pat. Off. | 206/45.23 |
|---|---|---|---|
| 2525004 | 12/1976 | Fed. Rep. of Germany | 206/224 |

Primary Examiner—Jimmy G. Foster
Attorney, Agent, or Firm—Richards, Harris, Medlock & Andrews

[57] ABSTRACT

A calculator money clip combines a small electronic calculator with a case and resilient clip. A resilient clip allows the calculator money clip to carry paper money and also serves as a means of attaching the device to a pocket, purse or briefcase compartment. The clip adds mechanical strength to the case. In the preferred embodiment the case includes a hinged cover which protects the calculator touch pad from abuse when it is carried in a pocket with other articles such as keys or coins.

18 Claims, 2 Drawing Sheets

CALCULATOR MONEY CLIP

FIELD OF THE INVENTION

This invention relates to men's accessories and more particularly to a pocket money clip combined with an electronic calculator.

BACKGROUND OF THE INVENTION

A money clip is a useful and well known accessory for carrying paper money. The use of a money clip allows folded bills to be carried in an organized way in a pocket or within a larger container such as a pouch, purse, briefcase or suitcase. Well known are the diverse articles which for convenience, utility, or aesthetic appeal have been combined with the money clip. Such articles include the penknife and nail file.

The electronic calculator has become a common personal articles as it has become more affordable and smaller in size. Calculators are known in a variety of sizes and have been incorporated into such common items as ball point pens, clipboards, watches and rulers. One of the most common forms for the electronic calculator is the "credit-card" calculator, so called for it's resemblance in size, to an ordinary credit card.

A small calculator is easily lost or damaged. A thin calculator, while it is convenient to carry, is easily bent. In addition, where a calculator is carried with other articles such as keys or coins it is easily marred or scratched.

The need exists then, for a small electronic calculator which is resistant to abuse. A need also exists for a small calculator which may be carried in a pocket, purse or briefcase and yet be located conveniently and quickly.

SUMMARY OF THE INVENTION

It is accordingly an object of the present invention to provide a small calculator which is mechanically strong.

It is another object of the present invention to provide a small calculator which is easy to locate and which may be carried in convenient locations.

It is a further object of the present invention to provide a calculator which is combined with a common accessory to minimize the space needed to carry both objects in the pocket or other confining space.

It is yet another object of the present invention to provide a rigid calculator case for thin calculators to prevent calculator damage due to flexing, bending and scratching or defacing the calculator face or surface finish.

These and other objects of the present invention are met by providing a thin, small electronic calculator with a rigid case. In the preferred embodiment the case is integrated with the calculator and includes a resilient clip and a hinged cover. The clip is attached to the back of the calculator case and provides mechanical strength. The clip protects the back of the device from unwanted abrasion. The hinged cover protects the face or touch pad of the calculator and may be used to carry ornamentation or other small personal effects. The invention is well suited for carrying folded paper money as would an ordinary money clip. The device may be clipped onto a shirt pocket, or onto an interior compartment of a purse or other case, thereby making the calculator quick and easy to find.

DETAILED DESCRIPTION OF THE DRAWING

Figure 1:
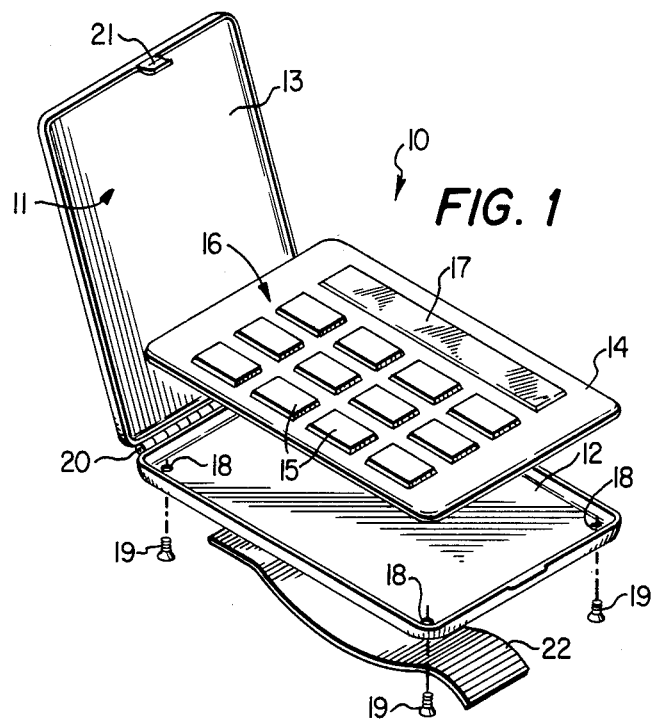
FIG. 1 shows a perspective view of the money clip calculator in a partially disassembled state.

In FIG. 1, a calculator money clip 10, is seen in a partially disassembled state. In the preferred embodiment the case 11 includes a base 12, a cover 13 and a top shell element 14. The top shell element is adapted to incorporate the various interfaces and electronic elements usually associated with an electronic calculator. This includes various keys 15 which make up the touch paid 16 and a display 17. Through holes 18 in the base permit the attachment and removal of the top shell element with the use of screws 19. Removal of the top shell element is important for servicing of the electronic calculator components and for changing the batteries contained therein. A hinge 20 allows the cover to be closed over the top shell element. In the closed position, the cover may be held in place by friction or a small clasp 21.

Figure 2:
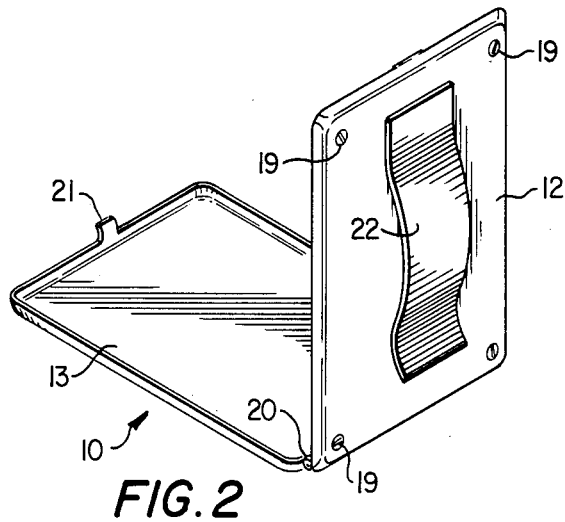
FIG. 2 is a perspective view of the money clip calculator showing the back of the case and the resilient clip.

FIG. 2 shows the back of base to which a resilient clip 22 as been affixed. The resilient clip is suitable for holding paper money so that the present invention may be used as a money clip. The clip also allows the device to be attached to a pocket, purse or interior compartment as may be found in a briefcase or suitcase.

Figure 3:
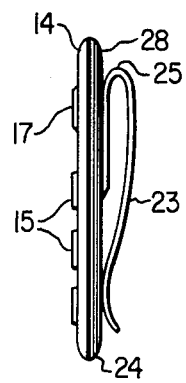
FIG. 3 is a side evaluation of the money clip calculator without a hinge or cover. A "U" shaped clip is shown attached to the back of the case.
Figure 4:
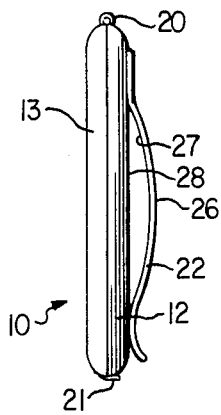
FIG. 4 is a side evaluation of the money clip calculator showing the case with the cover in the closed position.

Many varieties of resilient clips are suitable for the instant device and they may be formed in a variety of resilient materials. One variety of clip is shown in FIG. 3. A "U" shaped clip 23 is shown attached to a base 24. A "U" shaped clip is desirable where, for example, an adhesive is used to join the clip to the base. A "U" shaped clip has a large surface area available for bonding because it is folded. Where a fold 25 is used, the available bonding area is increased, but this also increases the total thickness of the device. A second type of clip is more suitable where bonding area is less important. FIG. 4 shows a second variety of resilient clip. The clip 22, has an exterior side 26 and an underside 27. The clip is attached to the back of the base 28 by its underside. This keeps the total thickness of the device to a minimum for a stated capacity of paper money.

Note that in FIG. 3 the device of the present invention is shown without a hinge or cover. The top shell element is intended to be interchangeable with bases both equipped with and lacking covers. Either of the aforementioned clips 22 and 23 is suitable with either base 12 or 24.

Figure 5:
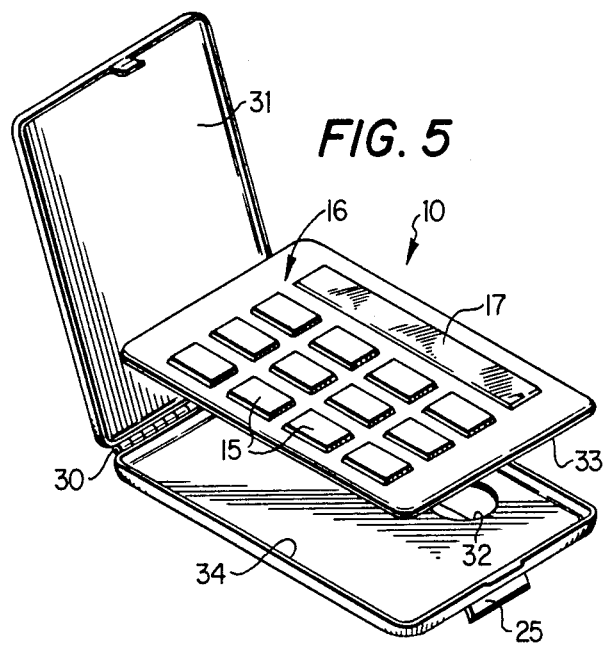
FIG. 5 is a perspective view of the present invention showing how a removable calculator may be inserted in the case.

In a second embodiment, shown in FIG. 5, a case 29 is provided with a hinge 30, a resilient clip 25, a cover 31, and an aperture 32. The case 29 is adapted to receive a removable calculator 33. The calculator 33 may be used apart from the case and inserted when it is desirable to do so. The calculator may be held in place by the walls of the base 34 or by friction. The aperture 32 allows a finger, pencil or other small object to be inserted for the purpose of ejecting the independently operable calculator from the base.

Figure 6:
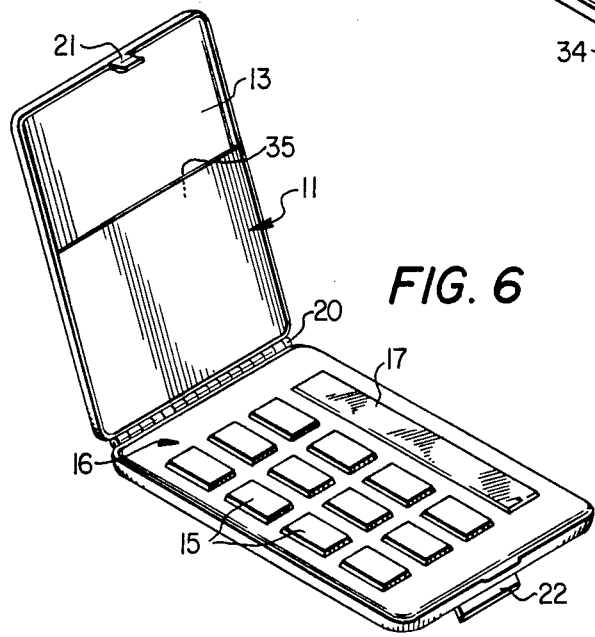
FIG. 6 is a perspective view of the money clip calculator showing the small compartment which may be located on the interior of the cover.

A small interior compartment 35 may be incorporated into the cover 13. This small convenience allows a note or a few stamps to be carried with the calculator money clip and may be desirable where the user doesn't carry a wallet. This is shown in FIG. 6 incorporated into a device which is otherwise similar to the device shown in FIG. 1. Alternatively, the calculator display may be incorporated into the cover, allowing the dimensions of the invention to be decreased. Using the aforementioned dimensions (one inch by two inches), placing the display in the cover would make room for the addition of more functions (square root, %, etc.) or make room to enlarge the size of the individual keys. Another variation is to employ a solar-powered calculator which may be made thinner and smaller in size and averts the need for battery changing. Because the calculator money clip is intended to be carried in a pants pocket, the size must be small enough to be comfortable to the user yet not so small as to be easily lost or inconvenient to use. The ideal size for the preferred embodiment of the calculator money clip is approximately two inches in length, one inch in width and, excluding the resilient clip, one eighth of an inch in thickness. It will be appreciated by those skilled in the art that many variations of the present invention may be practiced without departing from the spirit of the present invention. This is particularly true of some of the standard hardware incorporated, such as hinges and clasps. Various types of electronic calculator keys and displays are available in various sizes and it is contemplated that any type of key or display of suitable size may be used in accordance with the teachings of the present invention.

I claim:

1. A calculator money clip, comprising: electronic calculating components comprising a touch pad and a display; a case adapted to receive said electronic calculating components having an interior and an exterior, said electronic calculating components being positioned adjacent said interior of said case; and a money clip affixed to said exterior of said case, said clip being adapted to securely grip bills of currency against said exterior of said case, the case further comprising: a base, a hinge attached to the base, and a cover attached to the hinge, the cover having an open position and a closed position, whereby the cover in the open position allows access to the touch pad and in the closed position protects the touch pad and the display.

2. The calculator money clip of claim 1 wherein the dimensions of the calculator money clip not including the dimensions of the money clip are approximately two inches in length, one inch in width, and one eighth of an inch in thickness, thereby fitting comfortably in a pants pocket.

3. The calculator money clip of claim 1 wherein the money clip extends to substantially the length of the case.

4. The calculator money clip of claim 1 wherein the case further comprises a top shell element adapted to incorporate the touch pad and display; and the base is adapted to removably receive the top shell element, whereby the top shell element may be removed from the base for the purpose of servicing the electronic calculating components or changing batteries, but where the electronic calculating components are not usable when so removed.

5. The calculator money clip of claim 1 wherein the money clip is located on the base and extends substantially the length of the base; the resilient clip having an exterior side and an under side, whereby the money clip is attached to the base by the underside.

6. A calculator money clip comprising: electronic calculating components further comprising a touch pad and a display; a case for the electronic calculating components, the case further comprising a base, a hinge attached to the base, a cover attached to the hinge, the cover having an open position and a closed position, whereby the cover in the open position allows access to the touch pad and in the closed position protects the touch pad and display, a top shell element adapted to incorporate the touch pad and display; the base being adapted to removably receive the top shell element; and a money clip having an exterior side and an underside, said clip attached to the base by its underside and extending substantially the lengths of the base.

7. A calculator money clip comprising: an electronic calculator; a case for the electronic calculator, the case further comprising a base, the base having one or more apertures formed therein through which a finger, pencil or other object may be inserted for removing the calculator, a hinge attached to the base, a cover attached to the hinge, the cover having an open position which allows access to the electronic calculator and a closed position in which the cover protects the calculator; and a money clip which extends to substantially the length of the case.

8. A calculator money clip comprising: an electronic calculator; a case for the electronic calculator, the case further comprising a base, the base having one or more apertures formed therein through which a finger, pencil or other object may be inserted for removing the calculator, a hinge attached to the base, a cover attached to the hinge, the cover having an open position which allows access to the electronic calculator and a closed position in which the cover protects the calculator; and a money clip having an exterior and an underside, the money clip affixed to the base by its underside and extending substantially the length of the base.

9. A calculator money clip, comprising:
(a) a case having a base and a cover and an interior and an exterior surface, said base adapted to removably receive an electronic calculator, and a means for connecting said base to said cover and for providing pivotal motion of said cover relative to said base, said cover thereby having an open position and a closed position;
(b) an electronic calculator comprising a touch pad and a display on the top side thereof, said calculator received by said case so that said calculator rests on the base of said case and so that when the cover of said case is in said open position access to the touch pad is allowed and so that when said cover is in said closed position the cover protects the touch pad and display; and
(c) a money clip attached to said exterior surface of said case, said clip being adapted to securely grip bills of currency against the exterior surface of said case.

10. A money clip-calculator case, comprising:
(a) a case having a base and a cover, said base adapted to removably receive an electronic calculator, and a means for connecting said base to said cover and for providing pivotal motion of said cover relative to said base; and (b) a money clip affixed to the outside of said case, said clip being adapted to securely grip bills of currency against the outside of said case, wherein said base in comprised of solid material having at least one aperture formed therein of sufficient size to allow an object to push out a calculator contained in said case.

11. The money clip-calculator of claim 10, wherein said base is adapted to grasp an electronic calculator.

12. The money clip-calculator case of claim 10, wherein said case is about the size of a credit card.

13. The money clip-calculator case of claim 12, wherein said case is about 2 inches in length, about 1 inch in width and about ⅛ inch in thickness.

14. The money clip-calculator case of claim 10, wherein said resilient clip extends substantially the length of the case.

15. A money clip-calculator case, comprising:

(a) a case having a base adapted to removably receive an electronic calculator, said base having an interior and an exterior; and (b) a money clip affixed to the exterior of said base, said clip being adapted to securely grip bills of currency against the exterior of said case, wherein said base is comprised of solid material having at least one aperture formed therein of sufficient size to allow an object to push out a calculator contained in said case.

16. The money clip-calculator case of claim 15, wherein said base is adapted to grasp an electronic calculator.

17. The money clip-calculator case of claim 15, wherein said case is about 2 inches in length, and about 1 inch in width and about ⅛ inch in thickness.

18. The money clip-calculator case of claim 15, wherein said clip extends substantially the length of the case.

* * * * *